W. H. TREPUS.
Liquor Shaker and Strainer.
No. 196,605. Patented Oct. 30, 1877.
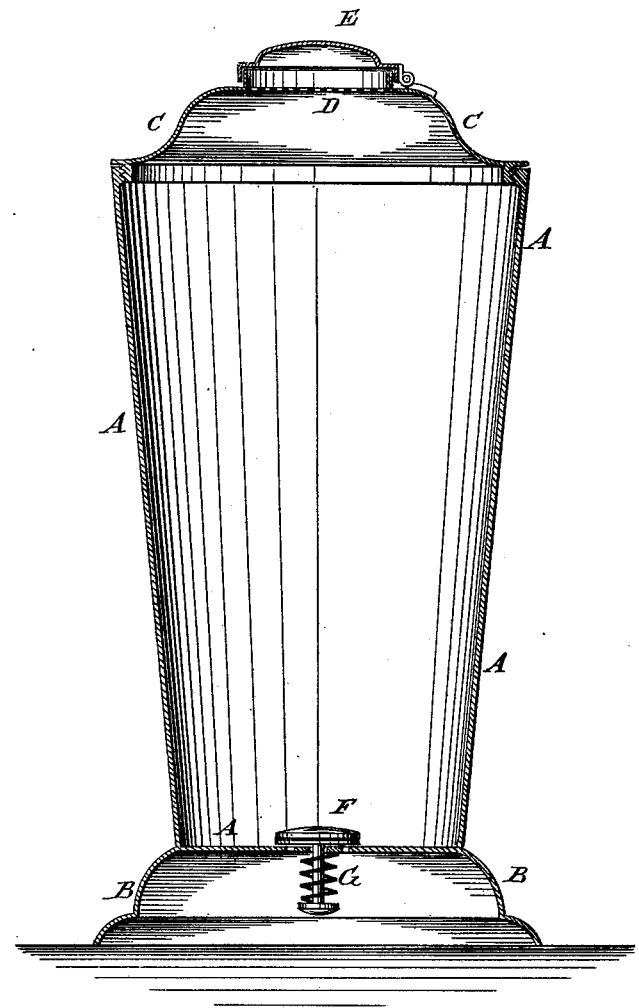
WITNESSES:
INVENTOR:
W. H. Trepus.
BY
ATTORNEYS.

UNITED STATES PATENT OFFICE.

WILLIAM H. TREPUS, OF CHICAGO, ILLINOIS.

IMPROVEMENT IN LIQUOR SHAKER AND STRAINER.

Specification forming part of Letters Patent No. 196,605, dated October 30, 1877; application filed September 29, 1877.

*To all whom it may concern:*

Be it known that I, WILLIAM HENRY TREPUS, of Chicago, in the county of Cook and State of Illinois, have invented a new and useful Improvement in Cocktail Shaker and and Strainer, of which the following is a specification:

The figure is a vertical section of my improved device.

The object of this invention is to furnish an improved device for preparing and straining cocktails and other mixed drinks quickly and neatly, and which shall be simple in construction and convenient in use.

The invention consists in the cup, provided with the foot, the cover, the strainer and cap, and the valve and spiral spring, to adapt it for use, as hereinafter fully described.

A is a cylindrical or slightly-flaring cup, of such a size as to hold from one to five or more drinks, and which has a downwardly-projecting flange, B, formed around its bottom to serve as a foot. In the mouth of the cup A is cut a screw-thread, which is designed to have one and a half or two turns, and into which fits a screw-thread, formed upon the edge of the cover C, so that the said cover can be screwed on or off by giving it one and a half or two turns. In the center of the cover C is formed, or to it is attached, a strainer, D, which is covered with a closely-fitting hinged cap, E. In the bottom of the cup A are formed one or more small holes, which are covered with a valve, F. The stem of the valve F passes out through a hole in the bottom of the cup A, and upon it is placed a spiral spring, G, the inner end of which rests against the bottom of the cup A, and its outer end rests against a disk, button, or knob attached to the outer end of the stem of the valve F.

In using the device, the cover C is removed, the ice and other ingredients are put in, the cover C is put on, and the device is shaken until the ingredients are thoroughly mixed. The cap E is then turned back, and, by pressing upon the knob of the valve-stem, air will be admitted, and the contents can be poured out through the strainer D. When a sufficient quantity has been poured out, the outflow is stopped by removing the pressure from the valve-stem, and the device can be moved to another glass without dripping upon the counter.

Having thus described my invention, I claim as new and desire to secure by Letters Patent—

The cup A, provided with the foot B, the cover C, the strainer and cap D E, and the valve and spiral spring F G, to adapt it for use, substantially as herein shown and described.

WILLIAM HENRY TREPUS.

Witnesses:
   THOS. OAKES,
   A. KNISELY.